Patented Oct. 21, 1947

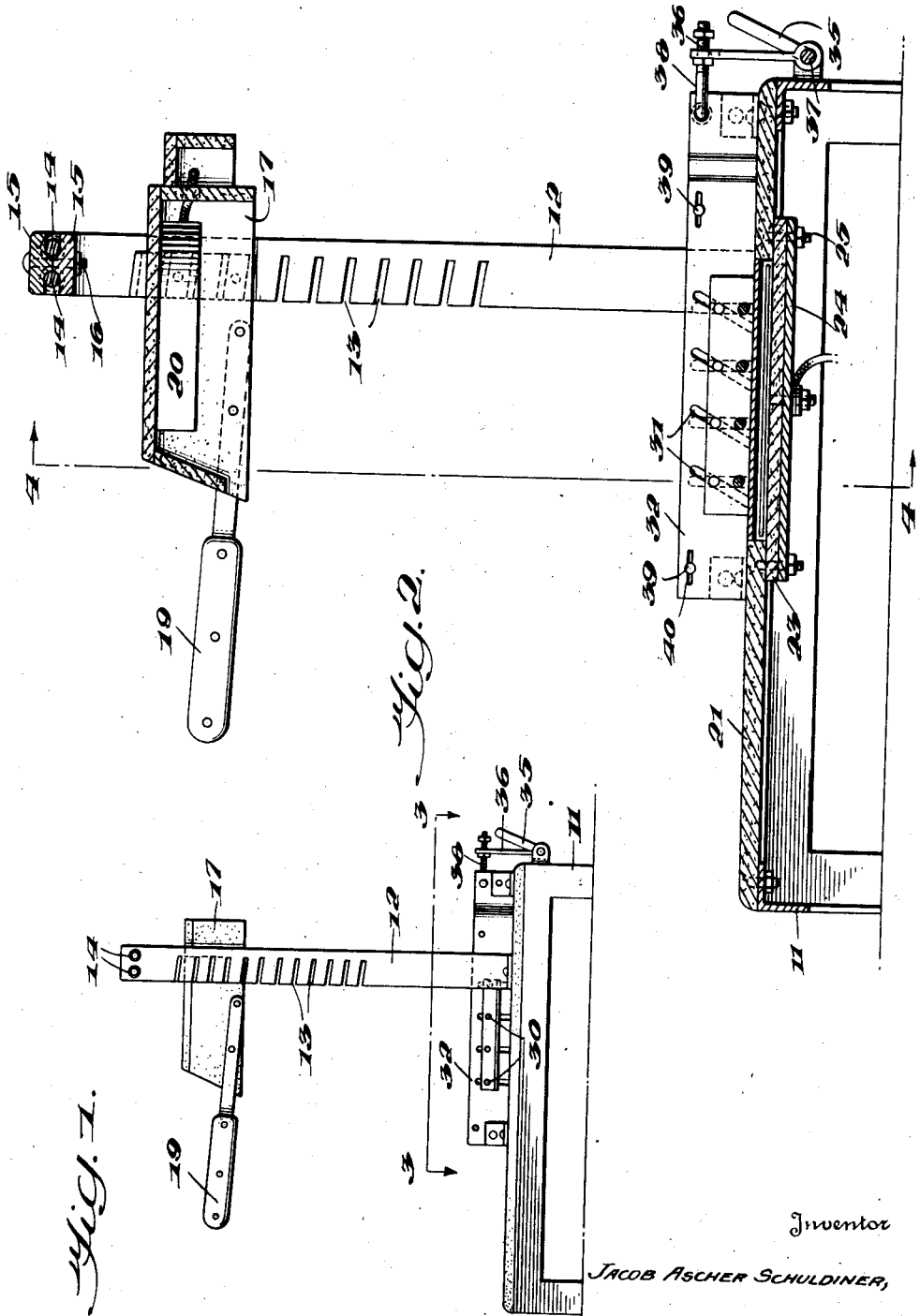

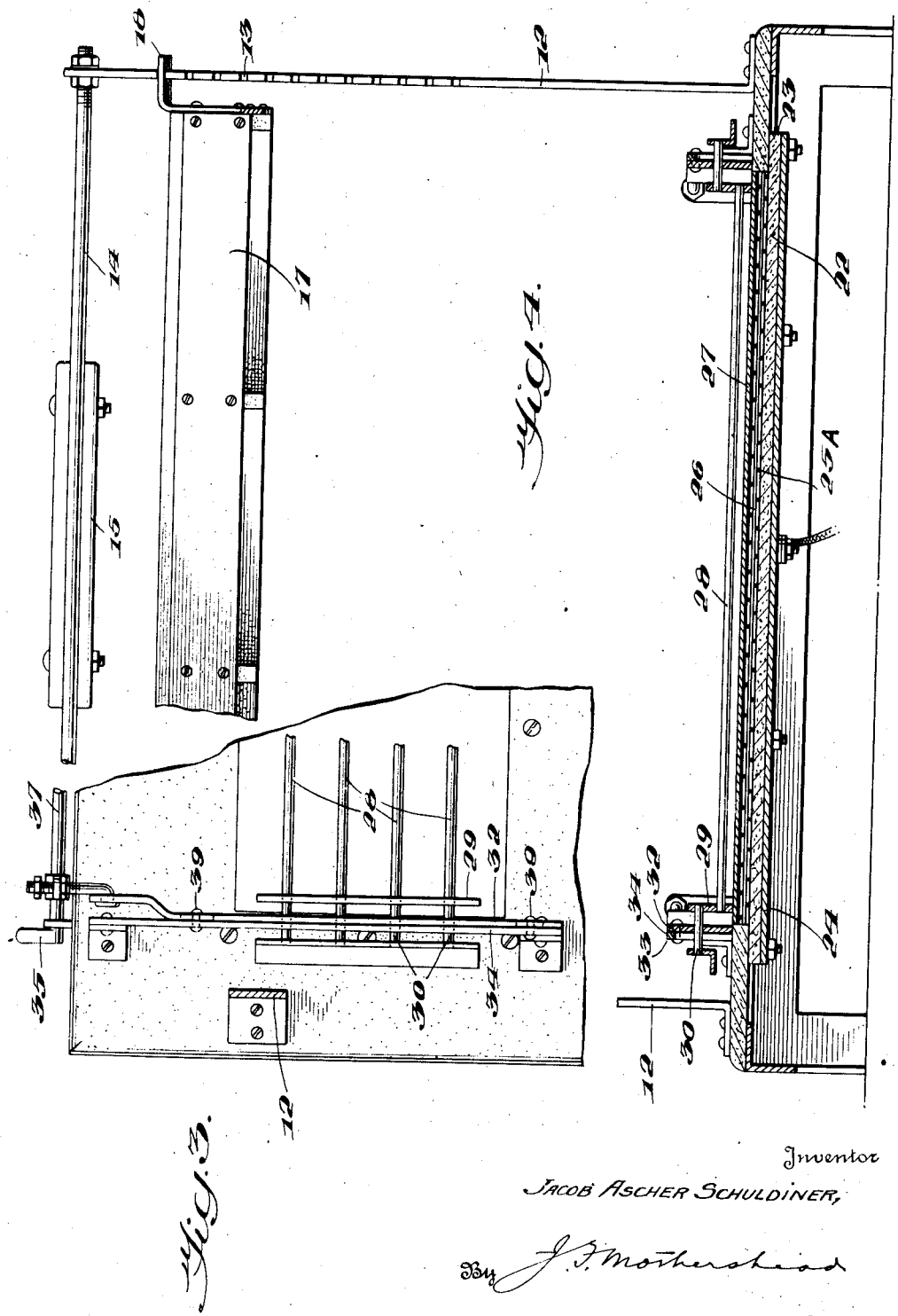

2,429,241

UNITED STATES PATENT OFFICE 2,429,241

ELECTRIC LABORATORY HEATER

Jacob Ascher Schuldiner, Brookline, Mass.

Application December 29, 1943, Serial No. 516,071

2 Claims. (Cl. 219—19)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to a device for use in a laboratory for doing various types of chemical work, including analytical work, in which evaporations and/or charrings and/or ashings are required of crude drugs, drug products such as sodium citrate or cupferron iron, as well as foods and food products such as preserves or sardines. It may also be used for glycerine analyses and for the determination of iodine in thyroid assays.

I apply the overhead heating principle for rapidly evaporating the liquid portion without ebullition and thereby avoid losses due to the loss of molecules of the residue by the violent ejection of water vapor. I provide means for selectively varying the distance between the liquid being heated and my upper electric heater which directs heat downwardly upon the surface of the liquid.

I use a lower auxiliary heater for charring and ashing the residues left after the liquid portions have been removed by evaporation.

In the accompanying drawings:

Fig. 1 is an elevation of my assembled heater;

Fig. 2 is a section of my heater;

Fig. 3 is a fragmentary plan on the line 3—3 of Fig. 1;

Fig. 4 is a section on the line 4—4 of Fig. 2, parts being broken away.

In these drawings, 11 represents a suitable base to which there are rigidly attached two vertical standards 12, each provided with a plurality of slots 13, preferably inclined, and also provided with, two perforations in which two horizontal connecting bars 14 are secured. A handle may be formed of identical sections 15 of heat insulating material clamped to the bars 14 by a bolt 16. A box-like downwardly open heater 17 of suitable insulating material, such as "transite," which is a composition containing asbestos pressed into sheets, is provided with two laterally-extending supporting fins 18 for engagement in the slots 13 and is also provided with two insulated handles 19 for adjusting the height of the heater by directing the supporting fins 18 into a selected pair of slots 13. This heater contains one or more electric heating elements 20 of a type commonly used in electric stoves and may be supplied with a substantially constant current.

The base 11 is provided with a top 21 of suitable heat refractory material, such as "transite" having a recess for receiving an auxiliary electric heater 22 (Figs. 2 and 4). This heater is supported by a sheet of compressed asbestos composition 23 which may be reinforced by a metal plate 24, both being secured to the top 21 by suitable fastenings as bolts 25. The electric heater 22 may be formed of a resistance wire 25A wound over a support 26 of mica or the like and have a cover plate 27 of suitable heat-conducting material, such as Monel metal.

Directly above the cover plate 26 is a grid composed of a plurality of bars 28 terminally secured to vertical plates 29 each provided with a plurality of pairs of laterally extending elevator rods 30 which extend into inclined slots 31 in parallel grid suspending plates 32, as well as through vertical slots 33 in stationary plates 34. The suspending plates 32 are reciprocated by means of a handle 35 having two crank arms 36 secured to a common connecting rod 37 and adjustable links 38 connecting each crank with a corresponding plate 32. The stationary plates are provided with lugs 39 which pass through horizontal slots 40 in the plates 32 and are provided with heads which prevent the accidental separation of the plates 32 from the stationary plates 34.

The grid bars are raised by the rotating handle 35 which pulls or pushes the vertical plate 32 causing the elevator rods 30 to move vertically in the slots 33 in the fixed plate 34, while the diagonal faces of the slots 31 in the reciprocated plates 32 serve as cams to raise or lower the grid.

The preferred procedure in using my device is: A sample in a suitable vessel is placed on the grid bars 28 and the heater 17 is adjusted on the standards at a height, selected by trial, to direct a desired intensity of heat against the sample which may be elevated by means of the handle 35.

The dried residue may be reduced to an ash by lowering the grid by means of the handle 35, and supplying current to my auxiliary heater. The overhead heater may be lowered in order to apply heat from above as well as below during the final ashing of the residue.

Should the sample contain a volatile liquid which forms an explosive mixture with air, the vapor of which would be ignited by my heating elements, some preliminary treatment to remove such liquid must be given the sample.

It should be understood that the present disclosure is for the purpose of illustration only, and that the invention includes all modifications and equivalents which fall within the scope of the appended claims.

I claim:

1. A laboratory heater for the rapid evaporation, drying, charring and ashing of substances comprising a laboratory dish supporting rack, an auxiliary electric heater, means for at will varying the distance between said rack and said heater, two vertically extending supports each provided with a plurality of notches, an inverted trough-like reflector having insulated, laterally positioned, forwardly extending plow-type handles and fin-like means adapted to enter any pair of the several notches, and radiant electric heating means within said trough-like reflector, whereby the temperature to which the specimens may be subjected may be quickly and easily varied during the process of dehydrating, charring and ashing the residue.

2. A laboratory heater of the class described comprising a main electric heater adapted to deflect heat downwardly, two spaced supports each provided with a plurality of laterally open notches, two laterally and oppositely extending lugs adapted to enter notches in said spaced supports, an auxiliary heater adapted to transmit heat upwardly, an article supporting grid, and means for adjustably supporting said grid comprising a plurality of pairs of laterally-extending elevator rods, two spaced stationary plates each provided with a plurality of vertical slots through which said elevator rods extend and one or more headed laterally-extending lugs, two spaced suspending plates each provided with slots for said laterally-extending lugs which freely slide therein, said suspending plates being also provided with link-receiving holes, and a plurality of inclined slots through which said elevator rods extend, a pair of spaced cranks rigidly secured to a revolubly mounted connecting rod, a pair of adjustable links for coupling said suspending plates to the the outer ends of said cranks and manually-operated means for rocking said connecting rod to reciprocate said suspending plates whereby the grid may be adjusted vertically while prevented from moving in a horizontal direction.

JACOB ASCHER SCHULDINER.

REFERENCES CITED

The following references are of record in the file of this patent:

UNITED STATES PATENTS

| Number | Name | Date |
| --- | --- | --- |
| 1,102,392 | Denhard | July 7, 1914 |
| 1,293,237 | Stovall | Feb. 4, 1919 |
| 2,202,265 | Phillips | May 28, 1940 |
| 2,057,421 | Dickson | Oct. 13, 1936 |